Oct. 1, 1935.　　　　L. A. DOUGHTY　　　　2,015,746

BATTERY CONTAINER

Filed Aug. 7, 1933

INVENTOR
Leon A. Doughty
BY
ATTORNEYS

Patented Oct. 1, 1935

2,015,746

UNITED STATES PATENT OFFICE 2,015,746

BATTERY CONTAINER

Leon A. Doughty, Glenside, Pa., assignor to Carlile & Doughty, Incorporated, a corporation of Pennsylvania Application August 7, 1933, Serial No. 683,992

6 Claims. (Cl. 136—170)

This invention relates to battery containers and especially to storage battery containers.

The principal objects of the invention are as follows:

(1) The provision of a battery case which is stronger and capable of standing more abuse than constructions previously in use.

(2) The provision of a battery case in which the cell covers are more accurately aligned in order to prevent subsequent cracking of the battery sealing compound as well as to present a neater appearance in the finished article.

(3) The provision of a battery in which the plate groups are prevented from shifting up and down during service due to jarring action such as might be imposed upon the battery when used in a truck or automobile.

(4) The provision of a battery in which the plate groups cannot be shifted or slid out of the case should the battery be picked up by the terminals or by the straps.

(5) The provision of a battery container in which, after the battery is worn out, the old plate groups cannot be removed and the battery casing filled with other plate groups of different or inferior manufacture.

(6) The provision of a battery in which concealed dowels are utilized in connection with the foregoing objects, which dowels, however, and the holes through which they pass, are effectively sealed against acid seepage or creeping.

How the foregoing objects, together with such other objects as may appear hereinafter, or are incident to my invention, are attained is illustrated in a preferred form in the accompanying drawing, wherein—

Figure 1:
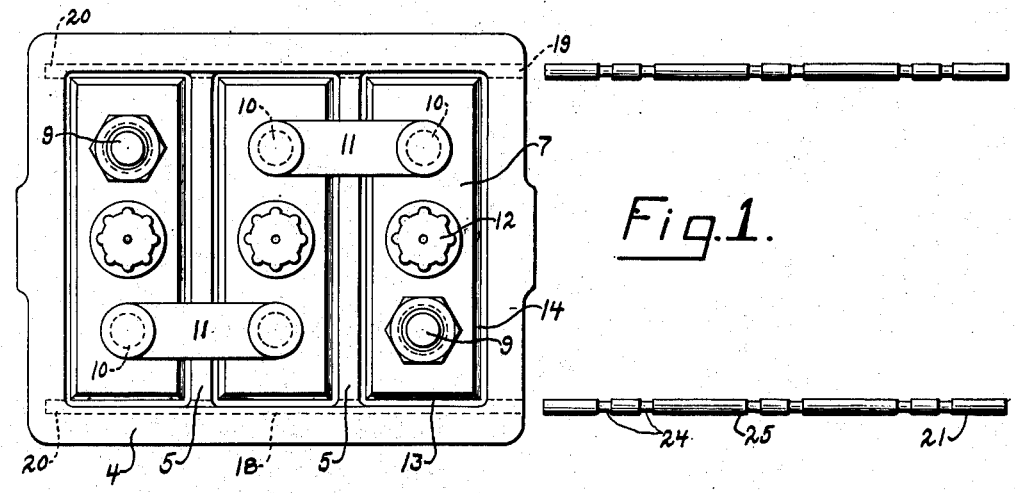
Fig. 1 is a plan view of my improved battery container with the dowel means used therewith lying to one side of the top of the battery in position to be inserted in the openings provided therefor.

As will be seen upon inspection of the drawing, my improved battery container includes a casing 4 having a plurality of cell partitions 5, the number of which latter, of course, will vary in accordance with the number of cells desired in the battery.

Each cell contains a plate group 6 with its cover member 7, the plate group of course, being made up of two sets of plates, one positive and the other negative. A casting 8 extends upwardly from each set through the cover 7, the portion of the casting outside the cover being formed, as usual, into a suitable terminal or binding post. In the end cells the connection 8 on one set of plates is formed as a battery terminal 9 while that on the other set, as well as those on the intermediate cells, are formed as binding posts 10, the circuit between cells being completed through the straps 11. Each cell cover is provided with a vent cap 12. The plates, terminals, binding posts, straps and vent caps are, of course, familiar in this art, and in and of themselves do not form a part of the present invention.

I form the cell covers with laterally projecting end flanges 13 and side flanges 14 at the base of the downwardly extending flange or apron portion 15. This construction, of course, provides a narrow depression or pocket 16 around the edges of each cell cover into which battery compound 17 is subsequently poured to seal the battery.

Figure 3:
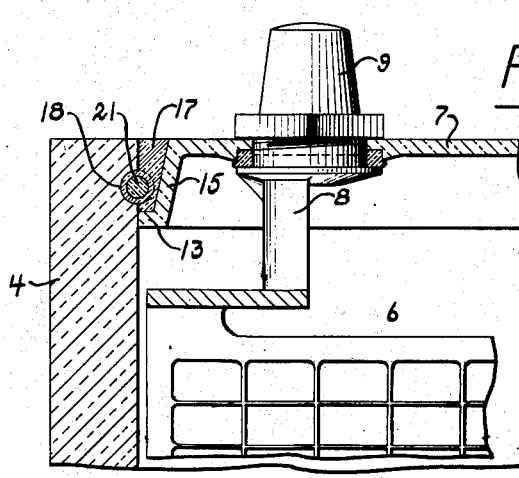
Fig. 3 is a partial section on an enlarged scale taken on the line 3—3 of Fig. 2.

Along the upper inner margin of the battery sides I provide semi-circular recesses 18 which are continued as apertures or openings through the partitions 5. These recesses are located at a point slightly above the upper faces of the shoulders 13 as shown to best advantage in Figure 3. I prefer to form these recesses and holes by drilling from one end of the battery container as at 19 through to the other end of the container as at 20, the hole at the end 20 terminating short of the outer wall of the casing.

Figure 2:
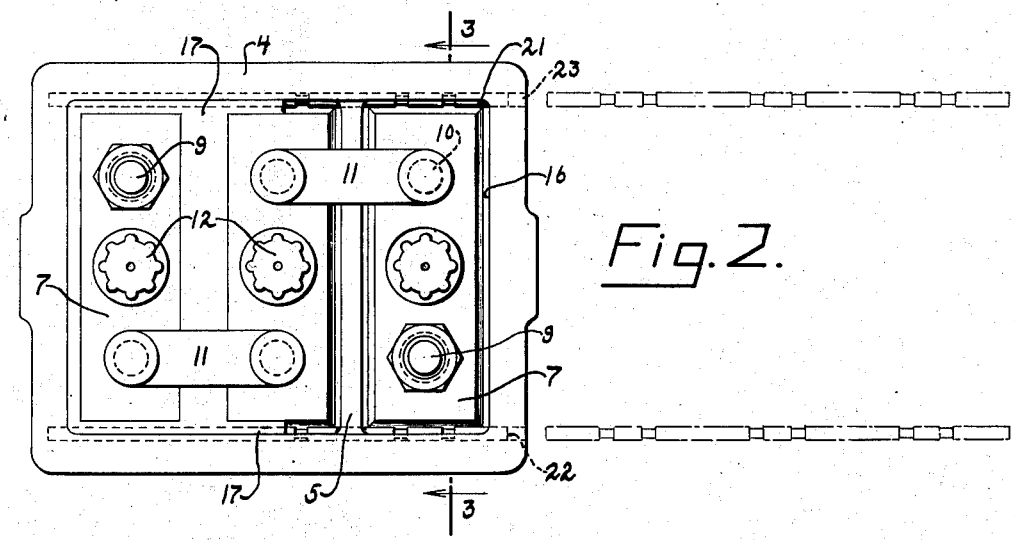
Fig. 2 is a view similar to Fig. 1 but showing the dowels in place in the container.

After the individual plate groups with their covers are placed in the several cells a dowel 21 is inserted through the recess 18 and the holes in the several partitions, the outer ends of which dowels, when in final position, terminate short of the end of the battery casing through which the holes were drilled as shown at 22 in Figure 2. The holes 23 at the ends of the dowels are then plugged up in any suitable manner as with battery compound, in order to conceal the dowels and prevent their withdrawal.

As will be seen from the drawing, I prefer to use multi-diametered dowels, and in the present instance I have shown dowels of two diameters 24 and 25, which diameters alternate throughout the length of the dowel, preferably in such a way as to bring a portion of large diameter into the holes in the partitions 5 so that as snug a fit as possible will be maintained at the partitions, the diameter at the partition, of course, being substantially equal to the diameter of the aperture in the partitions but just small enough to permit easy insertion.

As will be seen particularly upon inspection of

Figure 2, the dowels project from the recesses 18 inwardly over the shoulders 13 of the covers 7 but are spaced somewhat above the shoulders 13 so that the fluid battery sealing material 17 will flow, when applied, down to and around the bottom of the dowels in order that they may be completely embedded in the compound 17, the compound, of course, closely embracing the portions 24 of smaller diameter, as well as those of the larger diameter. It will be seen, therefore, that after the compound 17 has been poured and the ends of the holes at 23 plugged up, the dowels cannot be removed nor can the plate groups with their covers be replaced without breaking or mutilating either the case, the covers, or the dowels, or possibly all three of them.

It will be apparent that the arrangement will develop no difficulty from the standpoint of acid seepage since the compound 17 will effectively seal the holes in the partitions through which the dowels pass and prevent all possibility of any acid creeping along the length of the dowels.

Furthermore, the use of the dowels will ensure proper alignment of the individual plate groups because when assembling a battery it will be necessary for the workman to properly seat the plate groups in their cells before the dowels can be inserted. With constructions heretofore in use proper alignment has not always been achieved for the reason that a careless workman might tip or cant one of the plate groups so that after the sealing compound has been applied, a sudden bump or jar during service might dislodge a plate group so canted and make possible acid seepage through the resulting opening or crack. When the dowels are used in accordance with the present invention the plate groups are all accurately aligned and firmly held in position so that they will not loosen when subjected to jars or bumps in service. Furthermore, should the battery be picked up by its terminals or by the straps 11, as frequently happens in service, there is no danger of pulling the plate groups out of the casing. The construction, as a whole, is considerably stronger than previous constructions and the battery will be able to withstand more abuse in service.

Finally, my invention makes possible a non-refillable battery, that is, one in which, after use, the plates cannot be removed and replaced either with plates of another make or of an inferior quality, because if any attempt is made to remove the plates it will be necessary to in some way break or multilate either the cell covers, the container walls or the dowels, and probably at least the dowels and/or the covers and the casing. This latter is a very important feature of the invention because reputable battery manufacturers are constantly faced with the problem of protecting themselves against the sale of their battery casings containing their advertised identification markings in which inferior plate groups have been substituted by persons not authorized to make such replacements, and doing so in an effort to trade upon the reputation of the original manufacturer.

I claim:—

1. In a multi-celled battery having covers for the cells, the combination of a dowel seated in a recess in a wall of the battery in overhanging relation to the cell covers but spaced therefrom to provide clearance between the dowel and the covers, together with battery sealing compound embedding said dowel and filling said clearance space.

2. In a battery casing having a plurality of cell partitions, the combination with the covers for the cells, of a dowel in the casing wall which passes through openings in the partitions and projects laterally away from said wall to extend over the adjacent cover edges with a clearance space between the dowel and the covers, together with battery sealing compound embedding said dowel and filling said clearance space.

3. In a battery, a casing having a plurality of cell partitions, a plate group for each cell, a cover for each cell, said covers having marginal shoulders, dowel recesses in the casing walls adjacent said shoulders, said recesses continuing as apertures through the cell partitions and dowels seated in said recesses to project laterally therefrom so as to overhang said shoulders with a clearance space between the overhang and the shoulders, together with battery sealing compound embedding said dowel and filling said clearance space.

4. A battery casing having cell covers which are outwardly shouldered at their ends, and multi-diametered dowels seated in recesses in the side walls of the battery to project laterally therefrom so as to overhang said shoulders with a clearance space between the dowels and the shoulders, together with battery sealing compound embedding said dowels so as to fill said clearance space and surround those portions of the dowels which have a diameter less than the maximum.

5. In a multi-celled battery having covers for the cells, the combination of a multi-diametered dowel seated in a wall of the battery to overhang the adjacent edges of the cell covers with a clearance space between the dowel and the covers, together with battery sealing compound embedding said dowel so as to fill said clearance space and surround those portions of the dowel which have a diameter less than the maximum.

6. In a multi-celled battery casing having covers for the cells, the combination of a dowel fitting apertures in the cell walls and overlying the cell covers with a clearance space between the dowel and the covers, said dowel having portions over the cell covers of less dimension than the portions which fit the apertures, together with battery sealing compound embedding said dowel so as to fill said clearance space and surround said portions of less diameter.

LEON A. DOUGHTY.